(12) United States Patent
De Lavarene et al.

(10) Patent No.: US 11,290,540 B2
(45) Date of Patent: Mar. 29, 2022

(54) SYSTEM AND METHOD FOR USE OF SERVER-SIDE CONNECTION POOL TAGGING IN A MULTI-TENANT ENVIRONMENT

(71) Applicant: Oracle International Corporation, Redwood Shores, CA (US)

(72) Inventors: Jean De Lavarene, Versailles (FR); Vidya Hegde, Bangalore (IN); Saurabh Verma, Bangalore (IN); Chandra Sekhar Krishna Mahidhara, Bangalore (IN); Aramvalarthanathan Namachivayam, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 77 days.

(21) Appl. No.: 15/644,508

(22) Filed: Jul. 7, 2017

(65) Prior Publication Data

US 2018/0048718 A1 Feb. 15, 2018

Related U.S. Application Data

(60) Provisional application No. 62/374,490, filed on Aug. 12, 2016.

(51) Int. Cl.
*H04L 29/08* (2006.01)
*H04L 67/141* (2022.01)
*H04L 67/01* (2022.01)

(52) U.S. Cl.
CPC ............ *H04L 67/141* (2013.01); *H04L 67/42* (2013.01)

(58) Field of Classification Search
CPC ....... G06F 16/25; G06F 16/252; H04L 67/14; H04L 67/141; H04L 67/28; H04L 67/2809; H04L 67/42; H04L 67/10; H04L 67/1002
See application file for complete search history.

(56) References Cited

U.S. PATENT DOCUMENTS

| | | | | |
|---|---|---|---|---|
| 6,105,067 A | * | 8/2000 | Batra | ...................... H04L 67/14 709/203 |
| 6,615,265 B1 | | 9/2003 | Leymann et al. | |

(Continued)

FOREIGN PATENT DOCUMENTS

EP 2637111 9/2013

OTHER PUBLICATIONS

Das, Tulika, et al. "Oracle Database JDBC Developer's Guide, 12c Release 1 (12.1) E49300-05.", Jun. 2014, Chapter 23: Database Resident Connection Pooling (Year: 2014).*

(Continued)

*Primary Examiner* — Vivek Srivastava
*Assistant Examiner* — William C McBeth
(74) *Attorney, Agent, or Firm* — Tucker Ellis LLP

(57) ABSTRACT

Described herein are systems and methods for providing access to a database in a multi-tenant environment, including the use of a connection pool, and support for server-side connection pool multiple tagging. For example, the system can provide a capability to associate multiple connection properties with a particular server-side connection in, e.g., an Oracle Database Resident Connection Pooling (DRCP) environment; look up a connection with one or multiple properties; and provide information about a returned connection so that a requesting application can review the (Continued)

properties associated with the returned connection, in order to determine how best to "fix-up" or otherwise use that connection.

19 Claims, 9 Drawing Sheets

(56) References Cited

U.S. PATENT DOCUMENTS

| | | | |
|---|---|---|---|
| 8,543,554 | B1 | 9/2013 | Singh et al. |
| 9,098,565 | B1 | 8/2015 | Kumarjiguda et al. |
| 9,361,366 | B1 | 6/2016 | Yancey et al. |
| 9,690,622 | B1 | 6/2017 | Argenti et al. |
| 10,095,800 | B1 | 10/2018 | Yalamanchi |
| 10,356,173 | B2 | 7/2019 | Chang et al. |
| 2004/0006711 | A1* | 1/2004 | Krishnaswamy ............... G06F 16/24539 726/2 |
| 2004/0088413 | A1 | 5/2004 | Bhogi et al. |
| 2004/0143562 | A1 | 7/2004 | Chen et al. |
| 2004/0221031 | A1 | 11/2004 | Desai |
| 2004/0240386 | A1* | 12/2004 | Irudayaraj ............. G06F 16/252 370/235 |
| 2005/0038801 | A1* | 2/2005 | Colrain .................. G06F 16/21 |
| 2005/0120117 | A1 | 6/2005 | Burckart et al. |
| 2005/0172029 | A1 | 8/2005 | Burke et al. |
| 2005/0187979 | A1* | 8/2005 | Christensen .......... H04L 67/325 |
| 2006/0146877 | A1 | 7/2006 | Srivastava |
| 2006/0146878 | A1 | 7/2006 | Srivastava |
| 2007/0136311 | A1 | 6/2007 | Kasten et al. |
| 2007/0198684 | A1 | 8/2007 | Mizushima |
| 2008/0008095 | A1 | 1/2008 | Gilfix |
| 2008/0228923 | A1* | 9/2008 | Chidambaran ..... H04L 67/2809 709/227 |
| 2009/0034537 | A1 | 2/2009 | Colrain et al. |
| 2010/0036957 | A1* | 2/2010 | Patel ....................... H04L 67/14 709/227 |
| 2011/0153581 | A1 | 6/2011 | Kass |
| 2011/0277027 | A1 | 11/2011 | Hayton et al. |
| 2011/0307615 | A1* | 12/2011 | Krishnaswamy ............... G06F 16/24539 709/227 |
| 2012/0054245 | A1 | 3/2012 | Colle et al. |
| 2012/0066363 | A1 | 3/2012 | Somogyi et al. |
| 2012/0221608 | A1 | 8/2012 | An et al. |
| 2013/0097204 | A1 | 4/2013 | Venkataraman et al. |
| 2014/0324911 | A1 | 10/2014 | de Lavarene et al. |
| 2014/0372484 | A1 | 12/2014 | Baker et al. |
| 2014/0378756 | A1 | 12/2014 | Buster et al. |
| 2014/0379756 | A1* | 12/2014 | Shivarudraiah ....... G06F 16/252 707/781 |
| 2015/0026405 | A1* | 1/2015 | Hegde ................. G06F 12/0868 711/122 |
| 2015/0095343 | A1 | 4/2015 | Divilly et al. |
| 2015/0127680 | A1 | 5/2015 | Dutta et al. |
| 2015/0169650 | A1 | 6/2015 | Gajic |
| 2015/0207758 | A1 | 7/2015 | Mordani et al. |
| 2015/0348172 | A1 | 12/2015 | Vasantham et al. |
| 2017/0083386 | A1 | 3/2017 | Wing et al. |
| 2017/0331674 | A1 | 11/2017 | Wang |
| 2017/0331829 | A1 | 11/2017 | Lander et al. |
| 2018/0019922 | A1 | 1/2018 | Robison et al. |
| 2018/0285353 | A1 | 10/2018 | Ramohalli Gopala Rao et al. |
| 2019/0073387 | A1 | 3/2019 | Silberkasten et al. |

OTHER PUBLICATIONS

United States Patent and Trademark Office, Office Action dated Feb. 25, 2019 for U.S. Appl. No. 15/644,502, 11 Pages.
United States Patent and Trademark Office, Office Action dated Nov. 26, 2019 for U.S. Appl. No. 15/644,505, 13 Pages.
United States Patent and Trademark Office, Office Action dated Aug. 22, 2019 for U.S. Appl. No. 15/644,505, 16 Pages.
United States Patent and Trademark Office, Office Action dated Sep. 18, 2019 for U.S. Appl. No. 15/644,502, 11 Pages.
United States Patent and Trademark Office, Office Action dated Mar. 16, 2020 for U.S. Appl. No. 15/644,504, 29 pages.
United States Patent and Trademark Office, Notice of Allowance dated Apr. 1, 2020 for U.S. Appl. No. 15/644,502, 10 pages.
United States Patent and Trademark Office, Notice of Allowance dated Jun. 26, 2020 for U.S. Appl. No. 15/644,505, 17 pages.
United States Patent and Trademark Office, Notice of Allowance dated Oct. 7, 2020 for U.S. Appl. No. 15/644,504, 23 pages.
Oracle, "Oracle Database: Concepts", 11g Release 2 (11.2), May 2014, 470 pages.
Oracle, "Oracle Universal Connection Pool for JDBC: Developer's Guide", 11g Release 2 (11.2), Sep. 2009, 74 pages.
Oracle, "Database JDBC Developer's Guide: 23 Database Resident Connection Pooling", retrieved Mar. 10, 2017 from https://docs.oracle.com/cd/E82638_01/JJDBC/database-resident-connect, 5 pages.
Oracle, "Oracle Database Concepts", 11g Release 2 (11.2), May 2014, 472 pages.

* cited by examiner

SYSTEM AND METHOD FOR USE OF SERVER-SIDE CONNECTION POOL TAGGING IN A MULTI-TENANT ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Application titled "SYSTEM AND METHOD FOR USE OF SERVER-SIDE CONNECTION POOL TAGGING IN A MULTI-TENANT ENVIRONMENT", Application No. 62/374,490, filed Aug. 12, 2016, which is herein incorporated by reference.

CROSS-REFERENCE TO RELATED APPLICATIONS

This application is related to U.S. application Ser. No. 15/644,502, titled "SYSTEM AND METHOD FOR SUPPORTING LIVE ADDITION OF A TENANT IN A CONNECTION POOL ENVIRONMENT", filed Jul. 7, 2017; U.S. application Ser. No. 15/644,504, titled "SYSTEM AND METHOD FOR CONTROL OF MAXIMUM CONNECTIONS IN A CONNECTION POOL ENVIRONMENT", filed Jul. 7, 2017; and U.S. application Ser. No. 15/644,505, titled "SYSTEM AND METHOD FOR PERFORMING CONNECTION VALIDATION IN A MULTI-TENANT ENVIRONMENT", filed Jul. 7, 2017; each of which above applications is herein incorporated by reference.

FIELD OF INVENTION

Embodiments of the invention are generally related to software application servers and databases, and are particularly related to systems and methods for providing access to a database in a multi-tenant environment, including the use of a connection pool, and additional functionalities.

BACKGROUND

Generally described, in a database environment, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

SUMMARY

Described herein are systems and methods for providing access to a database in a multi-tenant environment, including the use of a connection pool, and support for server-side connection pool multiple tagging. For example, the system can provide a capability to associate multiple connection properties with a particular server-side connection in, e.g., an Oracle Database Resident Connection Pooling (DRCP) environment; look up a connection with one or multiple properties; and provide information about a returned connection so that a requesting application can review the properties associated with the returned connection, in order to determine how best to "fix-up" or otherwise use that connection.

DETAILED DESCRIPTION

As described above, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

Creating connection objects can be costly in terms of time and resources. For example, tasks such as network communication, authentication, transaction enlistment, and memory allocation, all contribute to the amount of time and resources it takes to create a particular connection object. Since connection pools allow the reuse of such connection objects, they help reduce the number of times that the various objects must be created.

One example of a connection pool is Oracle Universal Connection Pool (UCP), which provides a connection pool for caching Java Database Connectivity (JDBC) connections. For example, the connection pool can operate with a JDBC driver to create connections to a database, which are then maintained by the pool; and can be configured with properties that are used to further optimize pool behavior, based on the performance and availability requirements of a requesting software application.

Connection Labeling

Figure 1:
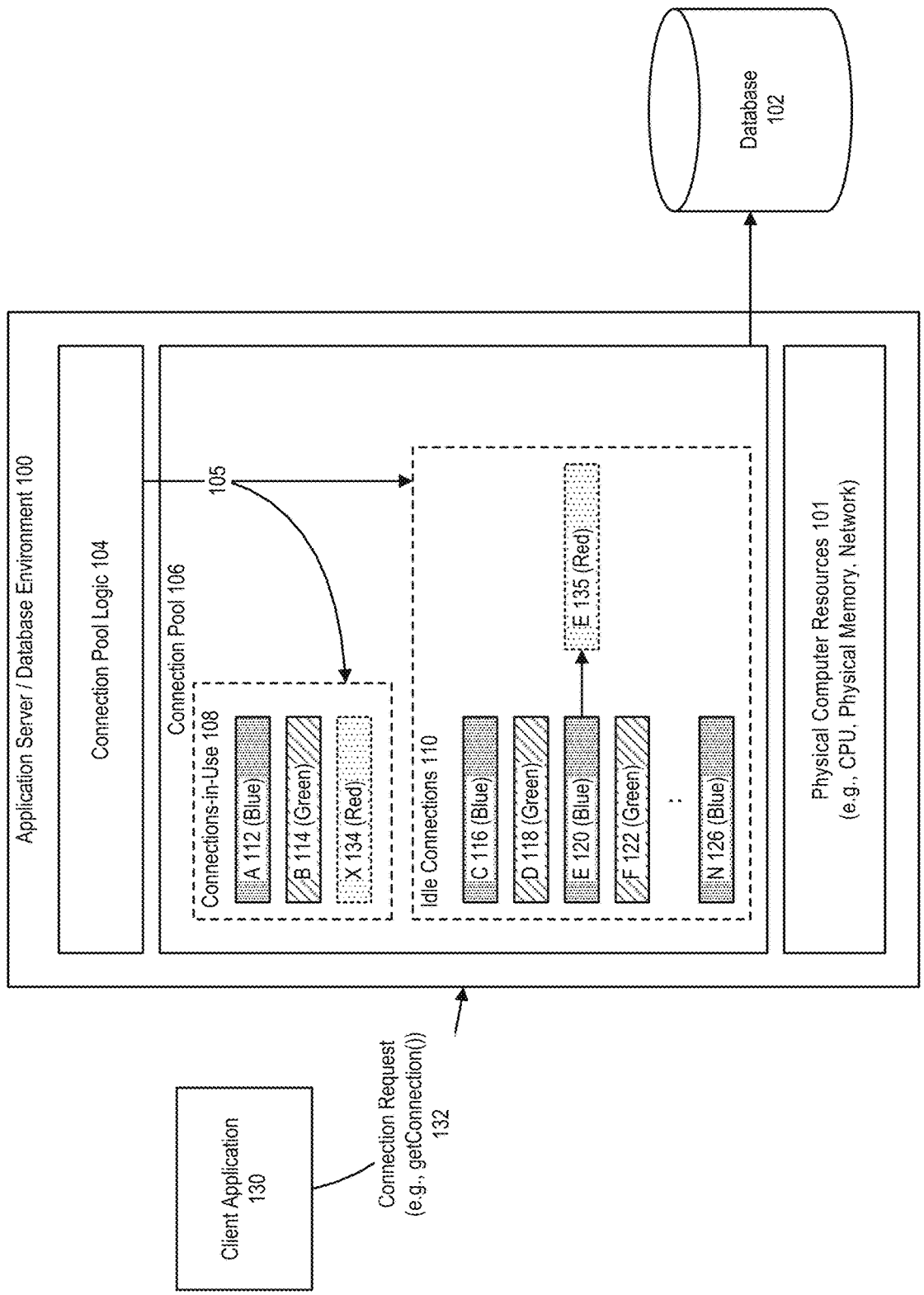
FIG. 1 illustrates a system that includes a connection pool, in accordance with an embodiment.

FIG. 1 illustrates a system that includes a connection pool, in accordance with an embodiment.

As illustrated in FIG. 1, in accordance with an embodiment, an application server or database environment 100, which includes physical computer resources 101 (e.g., a processor/CPU, memory, and network components), for example an Oracle WebLogic Server, Oracle Fusion Middleware, or other application server or database environment, can include or provide access to a database 102, for example an Oracle database, or other type of database.

As further illustrated in FIG. 1, in accordance with an embodiment, the system also includes a connection pool logic 104 or program code, which when executed by a computer controls 105 the creation and use of connection objects in a connection pool 106, including, for example, connections that are currently in use 108 by a software application, and connections that are idle 110, or are not currently being used.

Software applications can initialize connections retrieved from a connection pool, before using the connection to access, or perform work at the database. Examples of initialization can include simple state re-initializations that require method calls within the application code, or more complex initializations including database operations that require round trips over a network. The computational cost of these latter types of initialization may be significant.

Some connection pools (for example, UCP) allow their connection pools to be configured using connection pool properties, that have get and set methods, and that are available through a pool-enabled data source instance. These get and set methods provide a convenient way to programmatically configure a pool. If no pool properties are set, then a connection pool uses default property values.

In accordance with an embodiment, labeling connections allows a client software application to attach arbitrary name/value pairs to a connection. The application can then request a connection with a desired label from the connection pool. By associating particular labels with particular connection states, an application can potentially retrieve an already-initialized connection from the pool, and avoid the time and cost of re-initialization. Connection labeling does not impose any meaning on user-defined keys or values; the meaning of any user-defined keys and values is defined solely by the application.

For example, as illustrated in FIG. 1, in accordance with an embodiment, the connection pool can include a plurality of connections that are currently in use by software applications, here indicated as connections A 112 and B 114. Each of the connections can be labeled, for example connection A is labeled (Blue) and connection B is labeled (Green). These labels/colors are provided for purposes of illustration, and as described above can be arbitrary name/value pairs attached to a connection by a client application. In accordance with various embodiments, different types of labels can be used, to distinguish between different connection types; and different applications can attach different labels/colors to a particular connection type.

As further illustrated in FIG. 1, in accordance with an embodiment, the connection pool can also include a plurality of connections that are idle, or are not currently being used by software applications, here indicated as connections C 116, D 118, E 120, F 122, G 124 and N 126. Each of the idle connections can be similarly labeled, in this illustration as (Blue) or (Green), and again these labels/colors are provided for purposes of illustration.

As further illustrated in FIG. 1, in accordance with an embodiment, if a software application 130 wishes to make a request on the database, using a particular type of connection, for example a (Red) connection, then the application can make a "getConnection(Red)" request 132. In response, the connection pool logic will either create a new (Red) connection, here indicated as X 134 (Red); or repurpose an existing idle connection from (Blue or Green) to (Red), here indicated as E 135 (Red).

Sharded Databases

In accordance with an embodiment, sharding is a database-scaling technique which uses a horizontal partitioning of data across multiple independent physical databases. The part of the data which is stored in each physical database is referred to as a shard. From the perspective of a software client application, the collection of all of the physical databases appears as a single logical database.

In accordance with an embodiment, the system can include support for use of a connection pool with sharded databases. A shard director or listener provides access by software client applications to database shards. A connection pool (e.g., UCP) and database driver (e.g., a JDBC driver) can be configured to allow a client application to provide a shard key, either during connection checkout or at a later time; recognize shard keys specified by the client application; and enable connection by the client application to a particular shard or chunk. The approach enables efficient re-use of connection resources, and faster access to appropriate shards.

Figure 2:
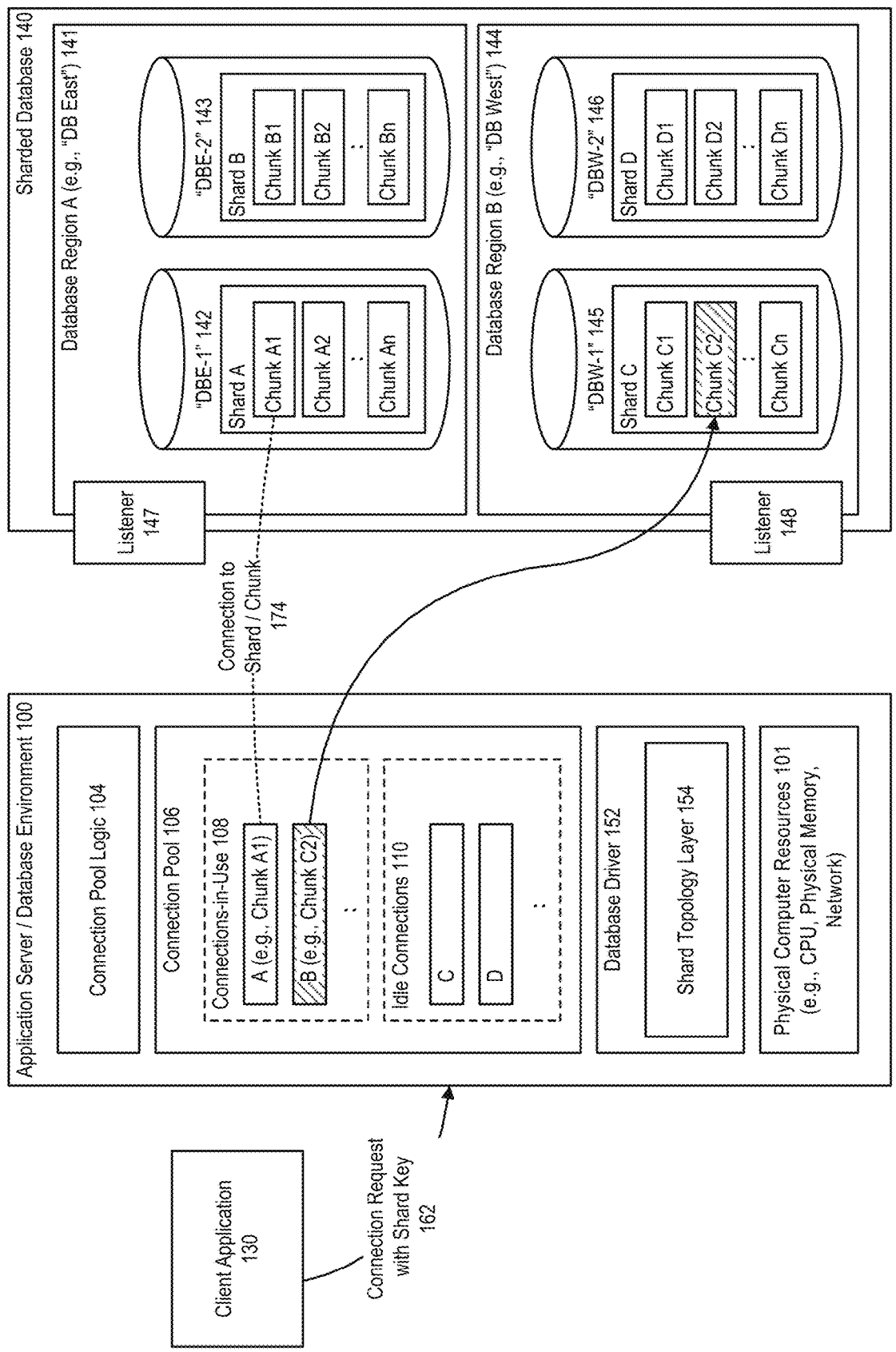
FIG. 2 further illustrates a system that includes a connection pool, including support for use of a sharded database, in accordance with an embodiment.

FIG. 2 further illustrates a system that includes a connection pool, including support for use of a sharded database, in accordance with an embodiment.

In accordance with an embodiment, a database table can be partitioned using a shard key (SHARD_KEY), for example as one or more columns that determine, within a particular shard, where each row is stored. A shard key can be provided in a connect string or description as an attribute of connect data (CONNECT_DATA). Examples of shard keys can include a VARCHAR2, CHAR, DATE, NUMBER, or TIMESTAMP in the database. In accordance with an embodiment, a sharded database can also accept connections without a shard key or shard group key.

In accordance with an embodiment, to reduce the impact of resharding on system performance and data availability, each shard can be subdivided into smaller pieces or chunks. Each chunk acts as a unit of resharding that can be moved from one shard to another. Chunks also simplify routing, by adding a level of indirection to the shard key mapping.

For example, each chunk can be automatically associated with a range of shard key values. A user-provided shard key can be mapped to a particular chunk, and that chunk mapped to a particular shard. If a database operation attempts to operate on a chunk that is not existent on a particular shard, then an error will be raised. When shard groups are used, each shard group is a collection of those chunks that have a specific value of shard group identifier.

A shard-aware client application can work with sharded database configurations, including the ability to connect to one or multiple database shards in which the data is partitioned based on one or more sharding methods. Each time a database operation is required, the client application can determine the shard to which it needs to connect.

In accordance with an embodiment, a sharding method can be used to map shard key values to individual shards. Different sharding methods can be supported, for example: hash-based sharding, in which a range of hash values is assigned to each chunk, so that upon establishing a database connection the system applies a hash function to a given value of the sharding key, and calculates a corresponding hash value which is then mapped to a chunk based on the range to which that value belongs; range-based sharding, in which a range of shard key values is assigned directly to individual shards; and list-based sharding, in which each shard is associated with a list of shard key values.

As illustrated in FIG. 2, in accordance with an embodiment a sharded database 140 can comprise a first database region A (here indicated as "DB East", DBE) 141, including sharded database instances "DBE-1" 142, with a shard A stored as chunks A1, A2, . . . An; and "DBE-2" 143, with a shard B stored as chunks B1, B2, Bn.

As further illustrated in FIG. 2, in accordance with an embodiment, a second database region B (here indicated as "DB West", DBW) 144, includes sharded database instances "DBW-1" 145, with a shard C stored as chunks C1, C2, Cn; and "DBW-2" 146, with a shard D stored as chunks D1, D2, . . . Dn.

In accordance with an embodiment, each database region or group of sharded database instances can be associated with a shard director or listener (e.g., an Oracle Global Service Managers (GSM) listener, or another type of listener). For example, as illustrated in FIG. 2, a shard director or listener 147 can be associated with the first database region A; and another shard director or listener 148 can be associated with the second database region B. The system can include a database driver (e.g., a JDBC driver) 152 that maintains a shard topology layer 154, which over a period of time learns and caches shard key ranges to the location of each shard in a sharded database.

In accordance with an embodiment, a client application can provide one or more shard keys to the connection pool during a connection request 162; and, based on the one or more shard keys, and information provided by the shard topology layer, the connection pool can route the connection request to a correct or appropriate shard.

In accordance with an embodiment, the connection pool can also identify a connection to a particular shard or chunk by its shard keys, and allow re-use of a connection when a request for a same shard key is received from a particular client application.

For example, as illustrated in FIG. 2, in accordance with an embodiment, a connection to a particular chunk (e.g., chunk A1) can be used to connect 174, to that chunk. If there are no available connections in the pool to the particular shard or chunk, the system can attempt to repurpose an existing available connection to another shard or chunk, and re-use that connection. The data distribution across the shards and chunks in the database can be made transparent to the client application, which also minimizes the impact of re-sharding of chunks on the client.

When a shard-aware client application provides one or more shard keys to the connection pool, in association with a connection request; then, if the connection pool or database driver already has a mapping for the shard keys, the connection request can be directly forwarded to the appropriate shard and chunk, in this example, to chunk C2.

When a shard-aware client application does not provide a shard key in association with the connection request; or if the connection pool or database driver does not have a mapping for a provided shard key; then the connection request can be forwarded to an appropriate shard director or listener.

Multi-Tenant Environments

In accordance with an embodiment, the system can include support for cloud-based or multi-tenant environments using connection labeling. For example, a multi-tenant cloud environment can include an application server or database environment that includes or provides access to a database for use by multiple tenants or tenant applications, in a cloud-based environment.

Figure 3:
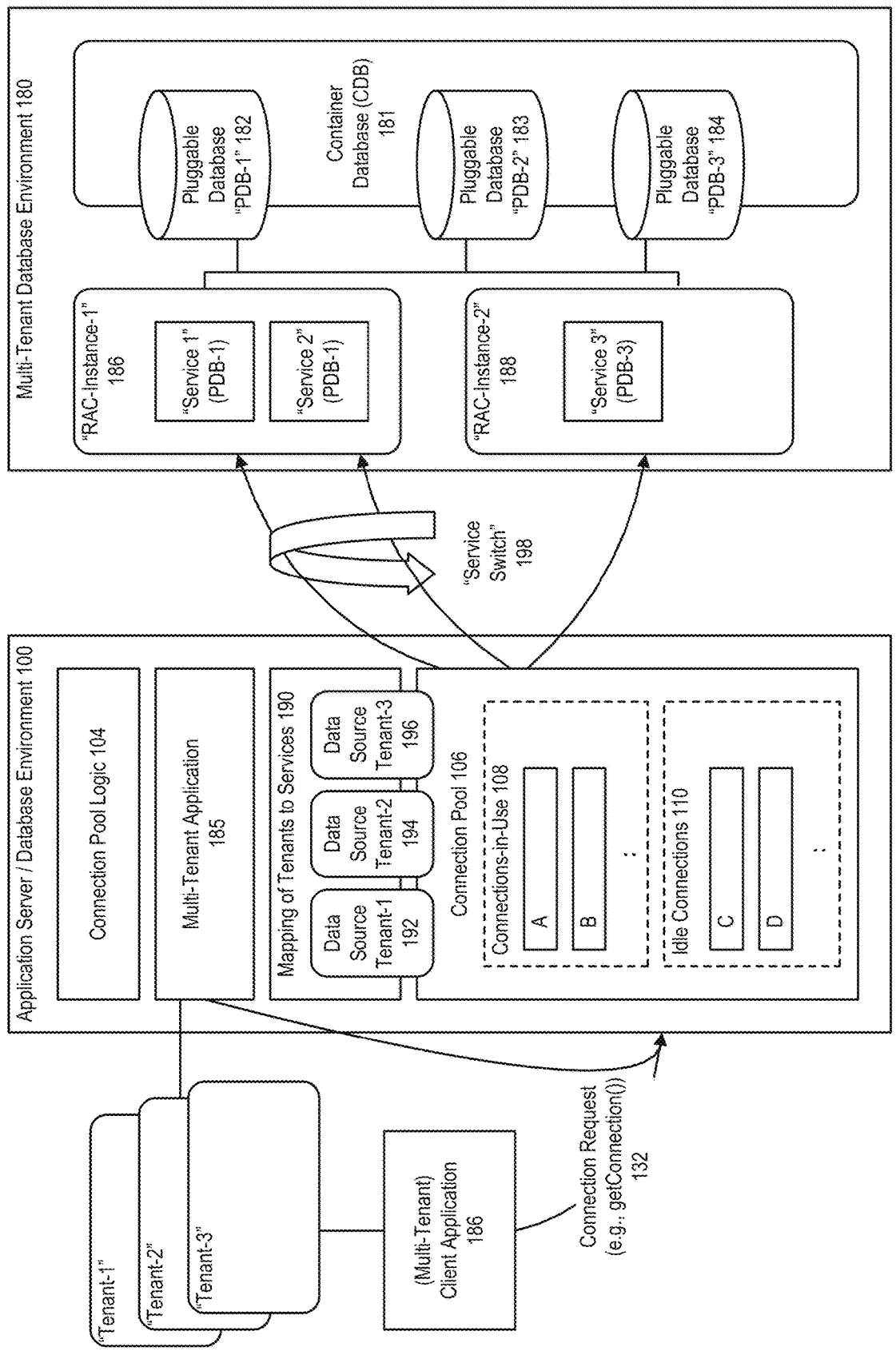
FIG. 3 further illustrates a system that includes a connection pool, including support for use in a multi-tenant environment, in accordance with an embodiment.

FIG. 3 further illustrates a system that includes a connection pool, including support for use in a multi-tenant environment, in accordance with an embodiment.

Software applications, which can be accessed by tenants via a cloud or other network, may, similarly to the environments described above, initialize connections retrieved from a connection pool before using the connection.

As described above, examples of initialization can include simple state re-initializations that require method calls within the application code, or more complex initializations including database operations that require round trips over a network.

As also described above, labeling connections allows an application to attach arbitrary name/value pairs to a connection, so that the application can then request a connection with a desired label from the connection pool, including the ability to retrieve an already-initialized connection from the pool and avoid the time and cost of re-initialization.

As illustrated in FIG. 3, in accordance with an embodiment, a multi-tenant database environment 180 can include, for example, a container database (CDB) 181, and one or more pluggable database (PDB), here illustrated as "PDB-1" 182, "PDB-2" 183, and "PDB-3" 184.

In accordance with an embodiment, each PDB can be associated with a tenant, here illustrated as "Tenant-1", "Tenant-2", and "Tenant-3", of a multi-tenant application that is either hosted by the application server or database environment 185, or provided as an external client application 186, and which provides access to the database environment through the use of one or more Oracle Real Application Cluster (RAC) instances 186, 188, including in this example "RAC-Instance-1", and "RAC-Instance-2"; one or more services, including in this example Service-1", "Service-2", and "Service-3", and a mapping of tenants to services 190.

In the example illustrated in FIG. 3, an application being used by a tenant to access the database environment, can make connection requests associated with that tenant's data source 192, 194, 196, and the system can switch services 198 if necessary, to utilize connections to existing RAC instances or PDBs.

Server-Side Connection Pools

In accordance with an embodiment, the system can utilize a server-side connection pool tagging feature, such as that provided, for example, by Oracle Database Resident Connection Pooling (DROP). A server-side connection pool tagging feature allows user applications or clients to selectively obtain a connection to a database environment, based on use of a single tag that is understood by that database environment.

In accordance with an embodiment, only one tag is associated per connection. The database server does not communicate the tag value to the user applications or clients, but rather communicates a tag-match (for example, as a Boolean value).

Server-Side Connection Pool (e.g., DRCP) Multiple Tagging

In accordance with an embodiment, the system can include support for server-side connection pool multiple tagging.

For example, the system can provide a capability to associate multiple connection properties with a particular server-side connection in, e.g., an Oracle Database Resident Connection Pooling (DRCP) environment; look up a connection with one or multiple properties; and provide information about a returned connection so that a requesting application can review the properties associated with the returned connection, in order to determine how best to "fix-up" or otherwise use that connection.

Some enterprise application computing environments, for example Oracle Fusion Applications, use database-side or server-side connection pools (e.g., DRCP) as a scalability solution.

However, the pooling mechanism used by environments such as Fusion Applications has functional restrictions when it comes to its uptake with DRCP. For example, an application developer can associate a particular property or a set of properties with a connection. Typical properties may include, for example, isolation_level, nls, or timezone_info. These labels are plain strings, and the pooling mechanism does not interpret them in any manner; they only make sense to the application itself, and help the application in choosing the best suited connection for a subsequent connection request.

Server-side connection environments such as DRCP do generally support the ability to tag a session. However, the tag is often a single string; and there is no way an application can apply multiple properties to a session. Due to this, setting multiple properties on a connection does not work well in, for example, a client-side or Java connection pooling mechanism, when using DRCP.

In accordance with an embodiment, the system can include a capability to associate multiple properties with a particular connection in DRCP. The system also enables an application to look up a connection with multiple properties, while providing enough information about the returned connection so that the application can look at all the properties associated with the returned connection, in order to determine how best to "fix-up" or otherwise use the connection.

Figure 4:
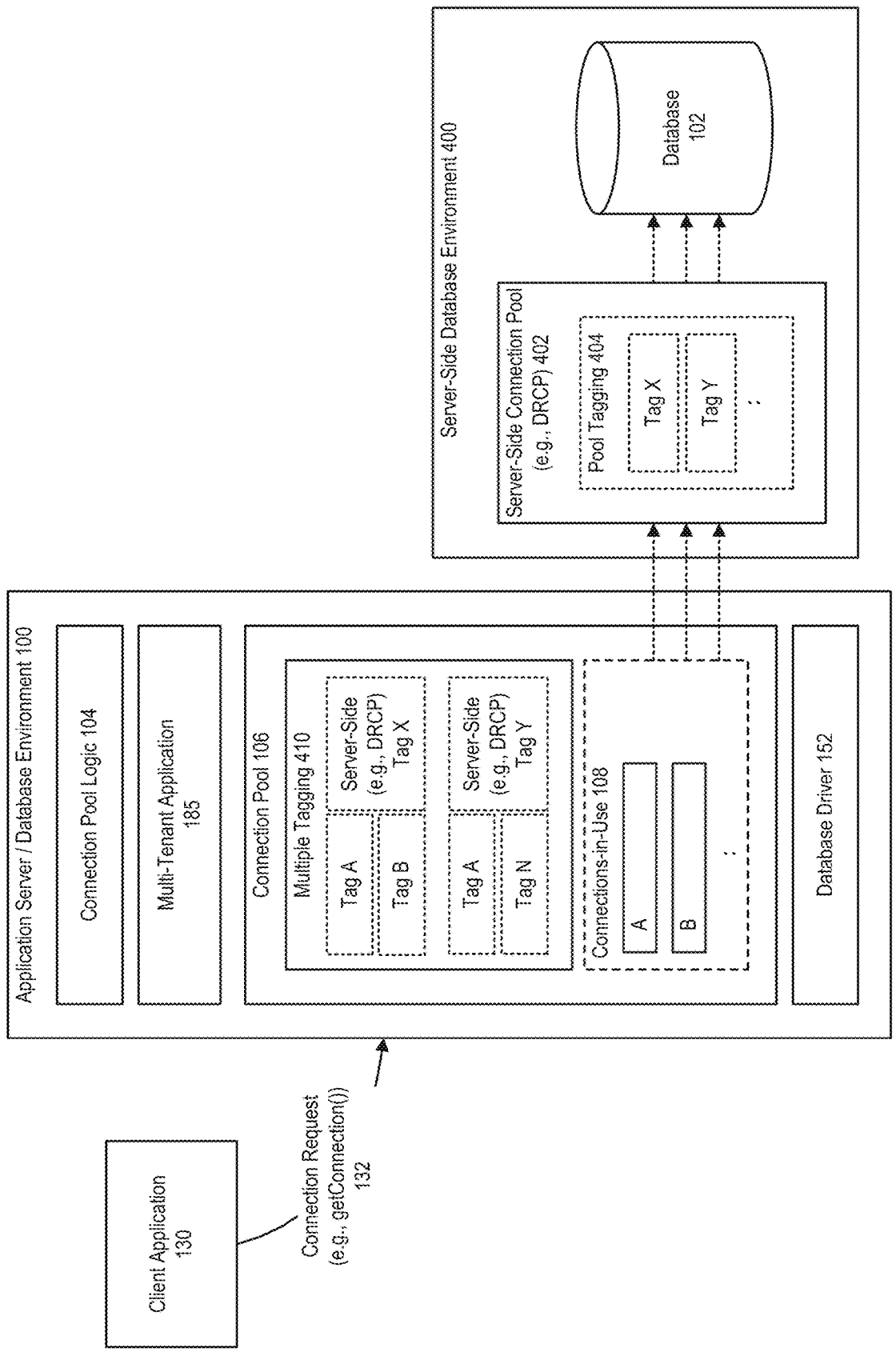
FIG. 4 illustrates an embodiment which supports server-side connection pool multiple tagging, in a connection pool environment.

FIG. 4 illustrates an embodiment which supports server-side connection pool multiple tagging, in a connection pool environment, in accordance with an embodiment.

In accordance with an embodiment, the server-side connection pool can include a plurality of connections (i.e., pooled servers), each connection comprising a server process and a database session; and can be shared by a plurality of middle-tier connection pools (e.g., the connection pool 106) for greater application and server scalability.

For example, in a middle-tier connection pool, if the minimum pool size is 200, then the connection pool has 200 connections to the database server, which would have 200 server processes associated with these connections If there are 30 middle tiers with a connection pool of minimum size 200, the database server has 6000 (200*30) corresponding server processes running. If, for example, 5% of the connections in a middle-tier connection may be used at any given time, out of the 6,000 server processes, only 300 server processes may be active at any given time, leading to over 5,700 unused server processes on the server. The unused processes are the wasted resources on the server.

In accordance with an embodiment, the sharing of the server-side connection pool by middle-tier connection pools can lower memory consumption on the database server because of reduced number of server processes, thereby application and server scalability.

As illustrated in FIG. 4, in accordance with an embodiment, the system can include or work with a server-side database environment 400 and server-side connection pool (e.g., DRCP) 402 that supports pool tagging 404.

In accordance with an embodiment, in the server-side connection pool, a tag can be applied to a given connection, and the tagged connection can be retrieved later. Connection tagging enhances session pooling since a specific sessions can be retrieved.

In accordance with an embodiment, while at the client-side (e.g., UCP) connection pool environment, the pool can support multiple tagging 410, the tag on a connection in the server-side connection pool may be a single string, and there is no way that an application can apply multiple properties to a session. Due to this, setting multiple properties on a connection does not work well in, for example, a client-side or Java connection pooling mechanism, when using DRCP.

In accordance with an embodiment, for example, as shown in FIG. 4, while DRCP may have one tag (e.g., "X", or "Y") associated per connection, which would have previously required, for example concatenating UCP tags (e.g., "AB"="X", or "AN"="Y"), to reflect the DRCP tag, the use of separate labelling enables a request received at a connection pool to be used to access individual ones of the server-side tags.

Figure 5:
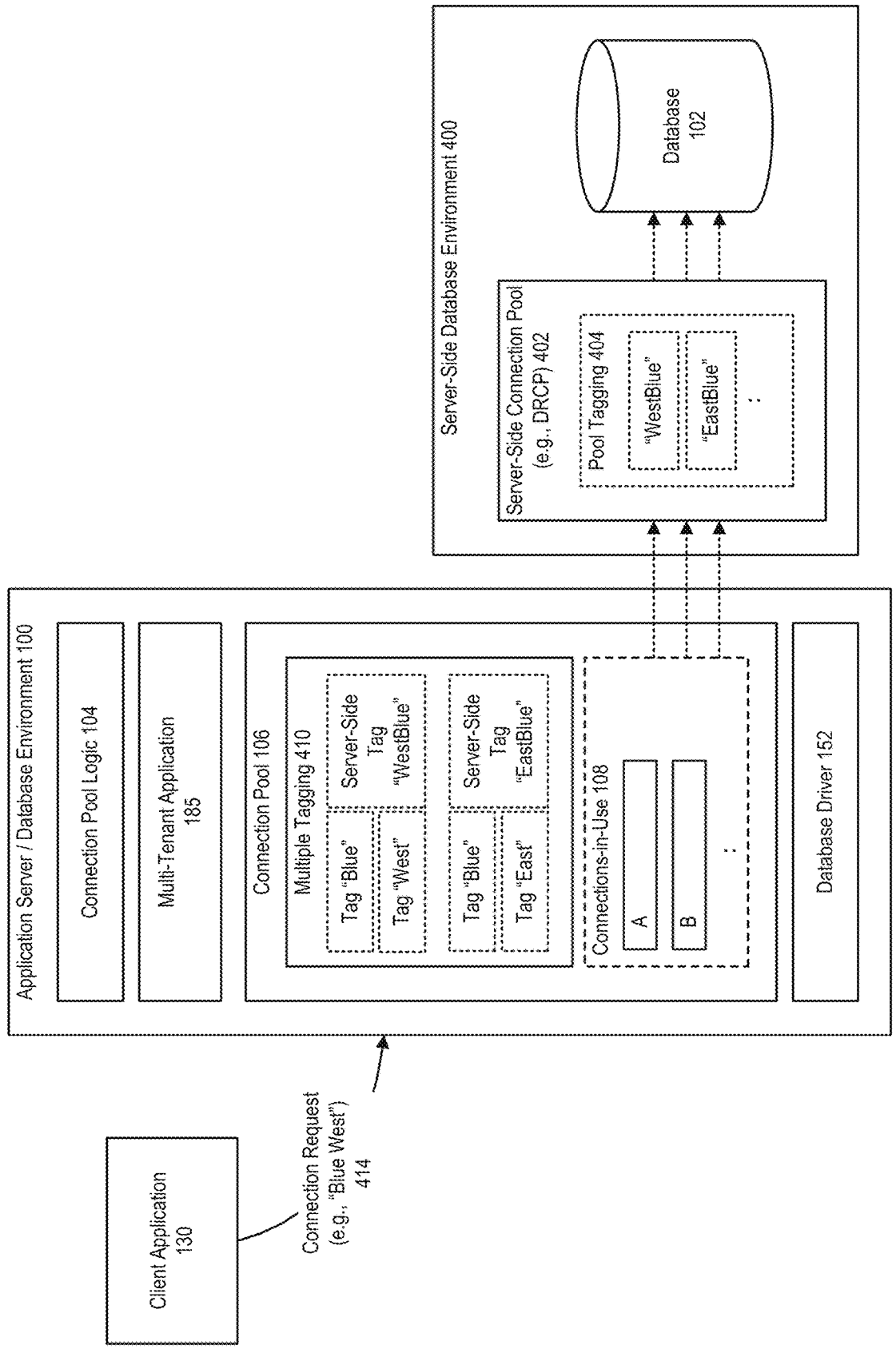
FIG. 5 further illustrates an embodiment which supports server-side connection pool multiple tagging, in a connection pool environment.

FIG. 5 further illustrates an embodiment which supports server-side connection pool multiple tagging, in a connection pool environment.

As illustrated in FIG. 5, in accordance with an embodiment, while DRCP has one tag associated per connection, which would have previously required, for example concatenating UCP tags to reflect the DRCP tag (e.g., a UCP combination of "blue+west"=DRCP "bluewest"), in accordance with an embodiment, the support for separate labelling enables a request received at a UCP connection pool, for a "blue west" connection 414, to perhaps access a "blue east" connection.

For example, as shown in FIG. 5, the UCP connection tagged with "blue" and "west" can be fully matched with the DRCP connection tagged with "west blue", and partially matched with the DRCP connection tagged with "east blue". If the fully matched DRCP connection is not available, the DRCP connection pool can selected the partially matched connection for use with the UCP connection.

In accordance with an embodiment, when the server-side connection pool multiple tagging feature is enabled on the server-side connection pool, a plurality of tags can be set on a DROP connection, and each of the plurality of tags can be a key value pair separated by an equal(=) character. The plurality of tags can be separated by a semi-colon (;) character or another character. In accordance with an embodiment, while retrieving a tagged connection, if a complete match is not found (all tags are not matched), then a search for a partial match can be performed.

In accordance with an embodiment, each of the plurality of tags on a DROP connection can be associated with a priority. In one implementation, the leftmost tag can have the highest priority and the rightmost tag can has the lowest priority. When more than one connection in the server-side connection pool matches the tags on a connection in the connection pool 106, the server-side connection with a higher-priority tag can be selected.

Figure 6:
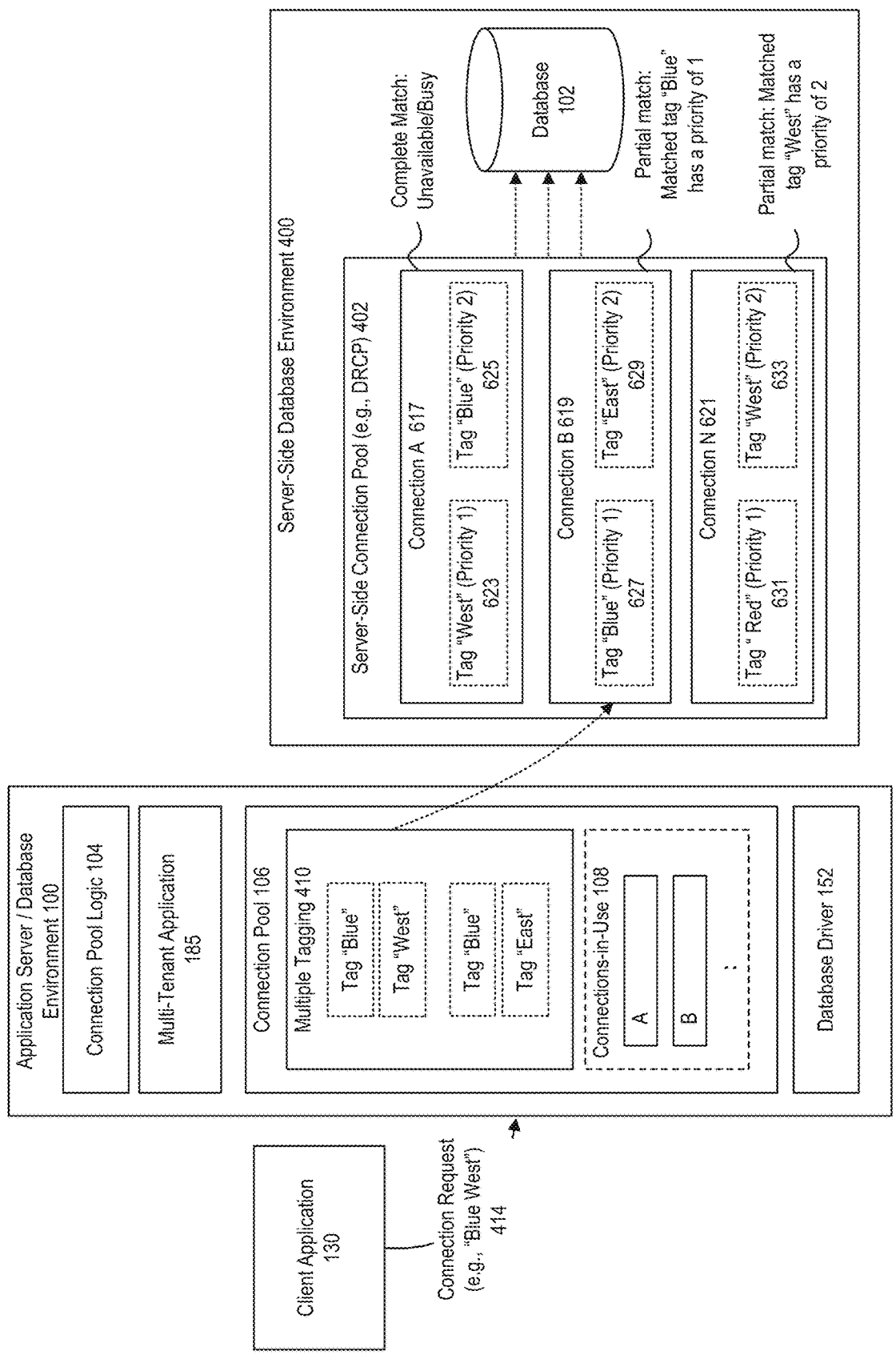
FIG. 6 further illustrates an embodiment which supports server-side connection pool multiple tagging, in a connection pool environment.

FIG. 6 further illustrates an embodiment which supports server-side connection pool multiple tagging, in a connection pool environment.

As shown in FIG. 6, connection A 617 in the server-side connection pool includes a tag "West" 623 with a priority 1, and a tag "Blue" 625 with a priority 2. Connection B 619 includes a tag "Blue" 627 with a priority 1, and a tag "East" 629 with a priority 2.

Similarly, connection N 621 includes a tag "Red" 631, and a tag "West" 633 with a priority 2.

In accordance with an embodiment, when the client application requests a connection with tags of "Blue" and "West", the connection 106 can identify a UCP connection with the requested tags, and attach the identified UCP connection to a server-side connection (e.g., a DROP connection) in the server-side connection pool, based on a complete tag match or a partial match.

In accordance with an embodiment, the server-side connection pool can locate connection 617, a server-side connection with a completely-matched tags. Since connection 617 is unavailable, the server-side connection pool can continue to identify one or more server-side connections with tags that partially match the tags on the client-side connection.

As shown in FIG. 6, connection B and connection N both include a partially-matched tag. However, since the partially-matched tag (i.e. Blue) in connection B has a higher priority than the partially-matched tag (i.e. West) in connection N, the server-side connection can select connection B for use with the client-side connection.

Figure 7:
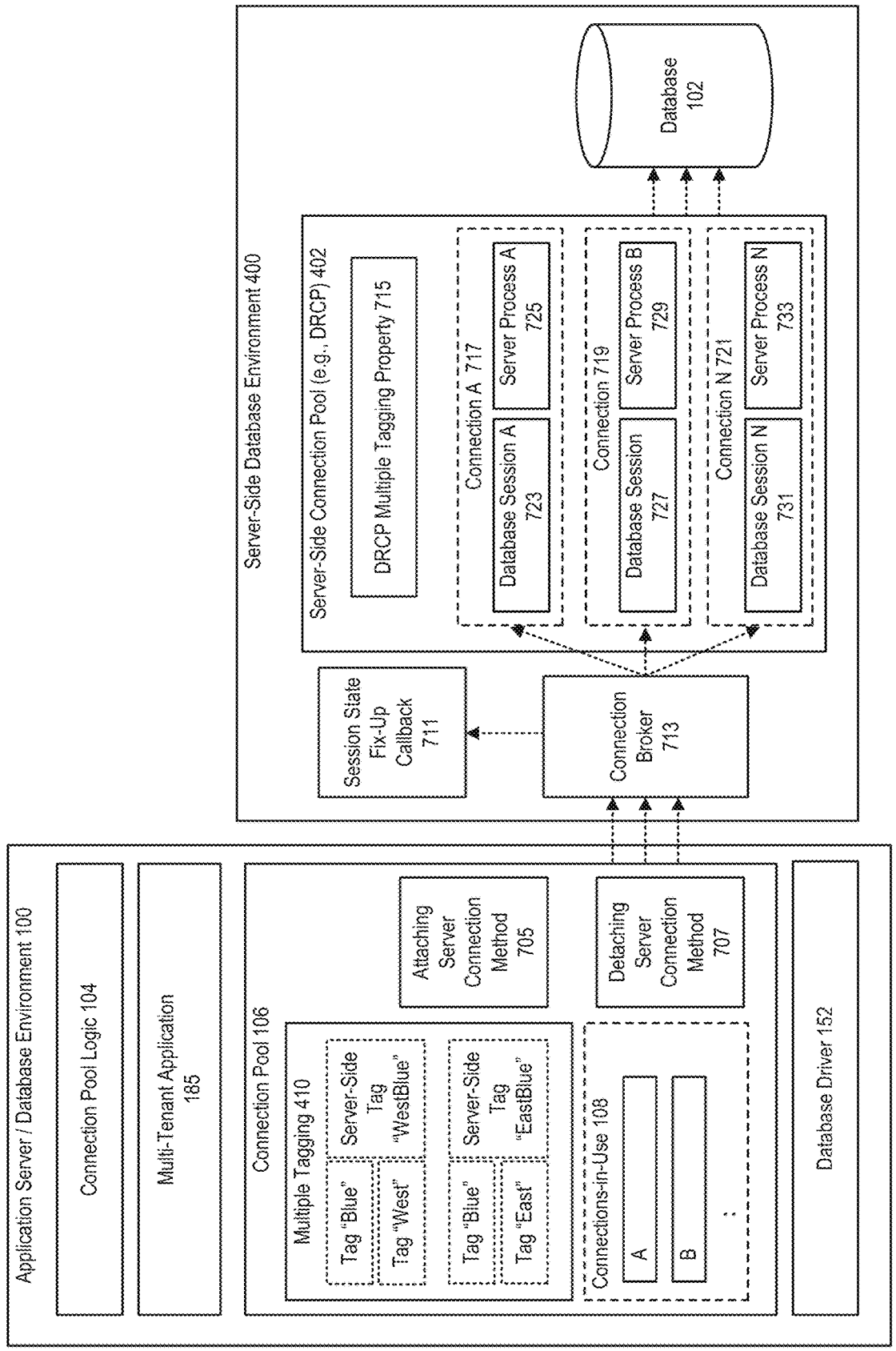
FIG. 7 further illustrates an embodiment which supports server-side connection pool multiple tagging, in a connection pool environment.

FIG. 7 further illustrates an embodiment which supports server-side connection pool multiple tagging, in a connection pool environment.

In accordance with an embodiment, each of the plurality of connections in the server-side connection pool can be a combination of a foreground server process and a database session. Database sessions belonging to a database user can shared among a plurality of proxy database users mapped to the database user.

As shown in FIG. 7, connection A 717 comprises database session A 723 and server process A 725, connection B 719 comprises database session B 727 and server process B 729, and connection N 721 comprises data session N 731 and server process N 733.

In accordance with an embodiment, the plurality of connections (i.e. DRCP connections) in the server-side connection pool can complement middle-tier connection pools (e.g., the connection pool 106) that share connections between threads in a middle-tier process. The DRCP connections can be shared across middle-tier processes on the same middle-tier host, across multiple middle-tier hosts, and across multiple middle-tiers (web servers, containers) accommodating applications written in different languages. The sharing of the DRCP connections can results in significant reduction in key database resources needed to support a large number of client connections, thereby reducing the database tier memory footprint and boosting the scalability of both middle-tier and database tiers.

In accordance with an embodiment, each UCP connection in the connection pool 106 can be placeholders in an "unattached" state. When a UCP connection is reserved by an application, the UCP connection can be first associated with a database session and a server process. When the connection is returned to the pool it is detached from the session and the server process.

In accordance with an embodiment, an attaching server connection method 705 can be invoked on a UCP connection to attach the UCP connection to a server process of a DRCP connection. A detaching server connection method 707 can be invoked to notify the server-side connection pool that a UCP connection in the connection pool is to be released. The server-side connection pool, upon a next invocation of the attaching server connection method on the released UCP connection, can pair the released connection with the server process of the same tag.

In accordance with an embodiment, the DRCP connections can be obtained from the server-side connection pool that connects to a connection broker 713, which can be a database background process. The connection broker can implement the pool functionality and multiplexes the pooled servers among persistent inbound connections from the connection pool.

In accordance with an embodiment, when the DRCP connection request is received at the connection broker from the connection pool, the connection broker can select an available server process from the server-side connection pool and, attach the server process to a UCP connection. When a notification is received that the UCP connection is to be released, the server-side connection pool can release the attached server process back into the server-side connection pool, and the UCP connection can be restored to the connection broker as a persistent inbound connection.

As described above, in accordance with an embodiment, when a DROP connection is to be selected from the server-side connection pool to be attached to a UCP connection, a complete or partial tag match can be performed. The connection pool can obtain DROP tag information through a JDBC driver.

In accordance with an embodiment, if a DROP connection with a partial tag match is selected, a session state fix-up callback method 711 can be called to fix up the state in the DROP pooled server associated with the DROP connection to the desired state.

As further shown by FIG. 7, the DCRP multiple tagging feature can be enabled or disabled using a DROP multiple tagging configuration property 715. When the property is set to true, the multiple tagging feature can be enabled. When the property is set to false, the feature can be disabled.

Figure 8:
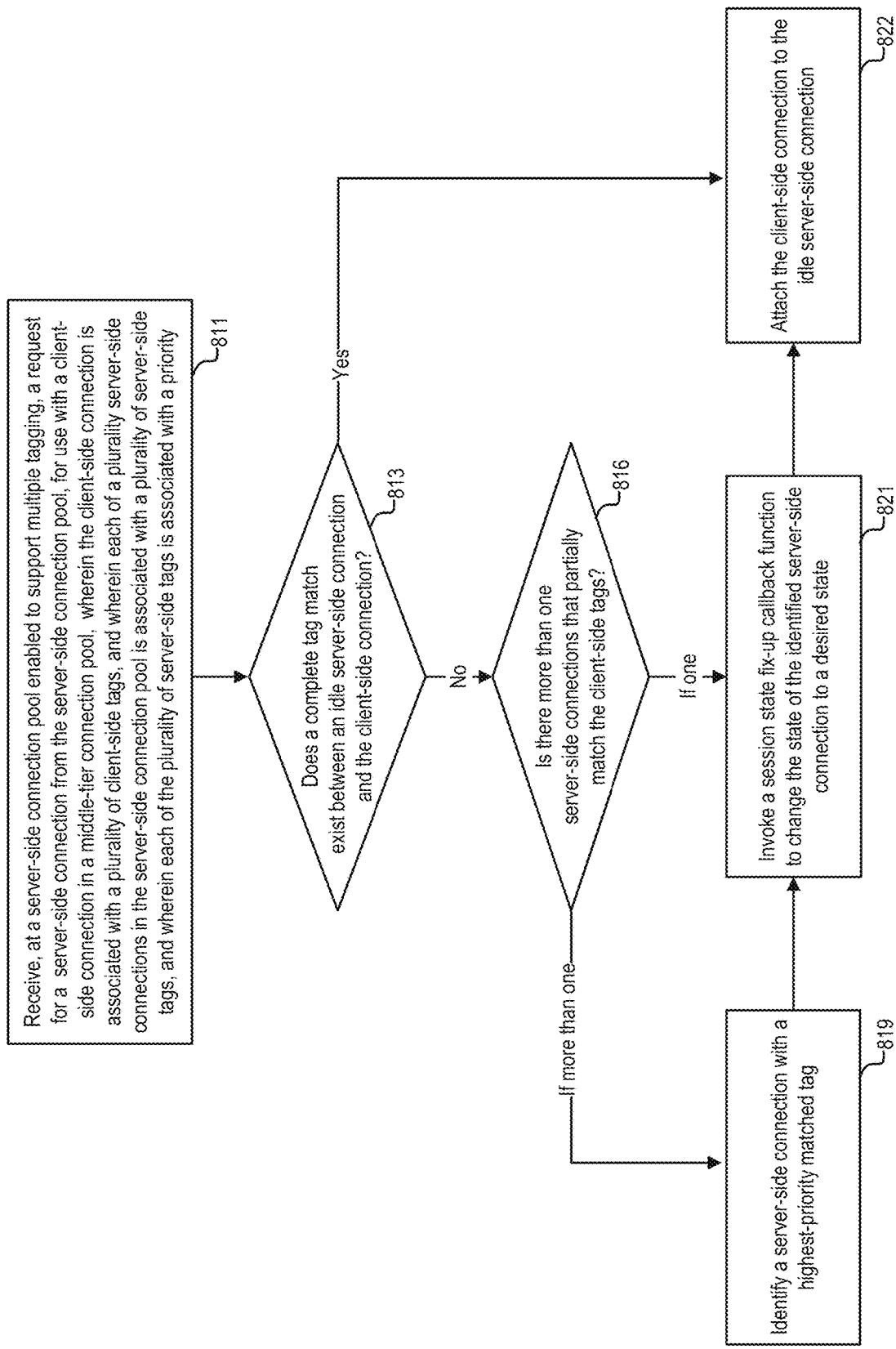
FIG. 8 illustrates a process for supporting server-side connection pool multiple tagging, in a connection pool environment.

FIG. 8 illustrates a process for supporting server-side connection pool multiple tagging, in a connection pool environment.

As shown in FIG. 8, at step 811, a request for a server-side connection from the server-side connection pool can be received at server-side connection pool enabled to support multiple tagging, wherein the requested server-side connection is to be used with a client-side connection in a middle-tier connection pool, wherein the client-side connection is associated with a plurality of client-side tags, and wherein each of a plurality server-side connections in the server-side connection pool is associated with a plurality of server-side tags, and wherein each of the plurality of server-side tags is associated with a priority.

At step 813, the server-side connection pool can determine whether a complete tag match exists between an idle server-side connection and the client-side connection. If an idle server-side connection whose server-side tags completely match the client-side tags, the client-side connection can be attached to the idle server-side connection as shown at step 822.

At step 816, if there is no server-side connection whose server-side tags can completely match the client-side tags, the server-side connection pool can continue to identify one or more server-side connections whose server-side tags can partially match the client-side tags.

At step 821, if there is only one server-side connection whose server-side tags partially match the client-side tags, the session state of the server-side connection can be fixed by invoking a session state fix-up callback function. The client-side connection can subsequently be attached to the server-side connection as shown at step 822.

At step 819, if more than one server-side connections exists whose server-side tags partially match the client-side tags, the server-side connection can identify a server-side connection with a highest-priority matched tag. The session state of the server-side connection with a highest-priority matched tag can be fixed up, at step 821. The client-side connection can subsequently be attached to the server-side connection, as shown at step 822.

Fix-Up Callback

In accordance with an embodiment, a "fix-up" callback is provided by the application, and is used to transform a session checked out from the pool to the desired state requested by the application. The fix-up callback can provide performance improvements to applications by running the "session state fix-up" logic on the server, thereby eliminating application round-trips to the database to run the fix-up logic.

JDBC Driver API

In accordance with an embodiment, the multiple tagging feature can be enabled by setting a connection property, e.g., 'oracle.jdbc.UseDRCPMultipletag' to 'TRUE'. Once enabled, the same APIs used for setting the DROP tag can be used for setting the multiple DROP tags. A difference is that the DROP tag has to follow some conventions, for example the key and value of a tag is separated by a 'equals' character and multiple tags are separated by a 'semi-colon' character. Key and value of a tag cannot be NULL or Empty.

isDRCPM ultitagEnabled( )

In accordance with an embodiment, this API is used for checking multiple tagging enabled status, and returns true if multiple tagging is enabled by setting the connection property.

getDRCPReturnTag( )

In accordance with an embodiment, this API returns the tag associated with this DROP pooled server. If multiple tags are used, they will be separated by a semicolon. If tagging is not enabled or not available, or if this connection is currently not attached to any DROP pooled server, then this method returns null.

PLSQL Fix-Up Callback

In accordance with an embodiment, a server side, e.g., Oracle PL/SQL (PLSQL) Callback for fixing up the session can be set by specifying the fully qualified PLSQL procedure name using an 'oracle.jdbc.DRCPPLSQLCallback' connection property.

UCP Labels

In accordance with an embodiment, UCP Labels can be used as connection tags (separated by ';' when multiple tagging is enabled), when DROP is enabled.

In accordance with an embodiment, a labeling callback's cost function is not used for calculating the cost for selecting the connection. Only a connection with an exact labels match will be picked for attaching to the server session. A new connection is created if no exact match is found. If a PL/SQL Callback is configured, along with multiple tag feature, then the labeling callback's configure method is not called for fixing-up the session; the PLSQL callback takes care of fixing the session at server side.

Figure 9:
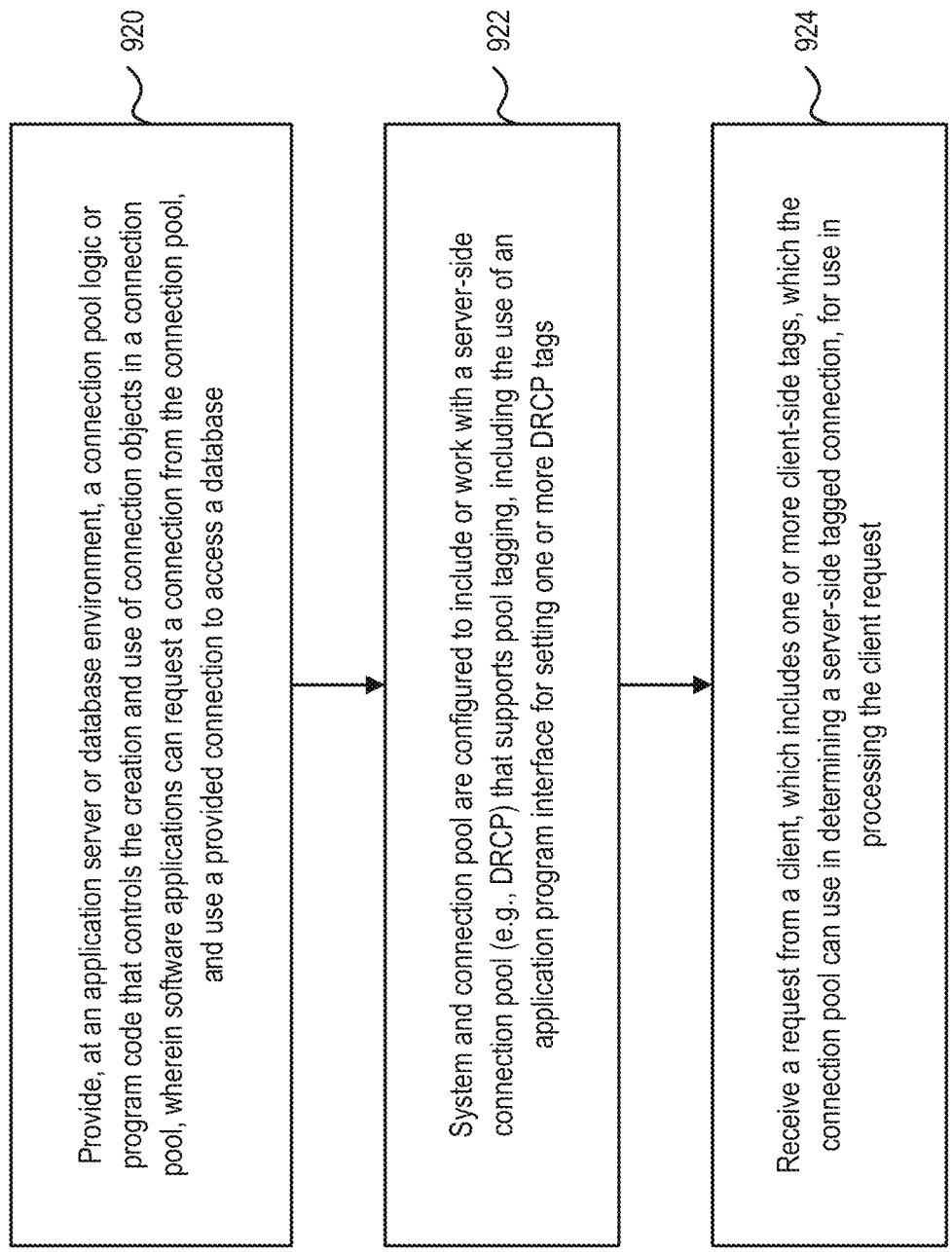
FIG. 9 illustrates a method of supporting server-side connection pool multiple tagging, in a connection pool environment, in accordance with an embodiment.

FIG. 9 illustrates a method of supporting server-side connection pool multiple tagging, in a connection pool environment, in accordance with an embodiment.

As illustrated in FIG. 9, at step 920, at an application server or database environment, a connection pool logic or program code is provided that controls the creation and use of connection objects in a connection pool, wherein software applications can request a connection from the connection pool, and use a provided connection to access a database.

At step 922, in accordance with an embodiment, the system and connection pool are configured to include or work with a server-side connection pool (e.g., DRCP) that supports pool tagging, including the use of an application program interface for setting one or more DRCP tags.

At step 924, a request can be received from a client, which includes one or more client-side tags, which the connection pool can use in determining a server-side tagged connection, for use in processing the client request.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for providing access to a database in a multi-tenant environment, including support for server-side connection pool multiple tagging, comprising:
   a computer including a processor;
   wherein the computer controls creation and use of connection objects in a connection pool that enables software applications to request a connection from the connection pool, and use a provided connection to access a database;
   wherein the system maintains, at the connection pool, a multiple tagging data that associates server-side tags with client-side tags, including that the multiple tagging data provides an indication of particular client-side tags for matching with particular server-side tags that are associated with server-side connections, and at a server-side connection pool:
      each server-side connection, of a plurality of server-side connections, is associated with a plurality of server-side tags set on that server-side connection and provided as a string of key value pairs that are associated with that connection; and
      each server-side tag, of the plurality of server-side tags, that are associated with the server-side connection is associated with a priority indicated by the string of key value pairs; and
   while retrieving, at the connection pool, a tagged connection from the server-side connection pool in response to a request from a client application, for use with a client-side connection associated with a plurality of client-side tags, a particular server-side connection is selected from within the server-side connection pool based on matching:
      those server-side tags that are associated with available server-side connections and provided as strings of key value pairs associated with those connections, with the plurality of client-side tags provided in the request received from the client application, as indicated by the multiple tagging data, and
      the priorities associated with those server-side tags, including when more than one server-side connection is associated with server-side tags partially matching the client-side tags, then the particular server-side connection with higher priority matched tag is selected;
   wherein the client application provides a callback that is used by the system to transform a connection and associated session that is checked out from the connection pool to a state requested by the client application without a round-trip to the database, including wherein if a server-side connection with a partial tag match is selected, a session state fix-up callback method is called to fix up the state associated with the particular server-side connection to the requested state; and
   wherein the particular server-side connection is returned and attached to the client-side connection for use by the client application to access the database.

2. The system of claim 1, further comprising:
   wherein the system associates multiple connection properties with a particular server-side connection, and enables the connection pool to look up a connection with multiple properties, and to provide information about a returned connection so that a requesting application can determine properties associated with the returned connection in order to determine how best to use the returned connection.

3. The system of claim 1, wherein the server-side connection pool is a Database Resident Connection Pooling (DRCP) or other environment, which supports an ability to tag a session.

4. The system of claim 1, wherein multiple properties can be associated with a particular connection in server-side connection pool; and wherein an application can look up a connection with multiple properties, while the connection pool provides information about the returned connection so that the application can look at the properties associated with the returned connection, to determine how best to use the returned connection.

5. The system of claim 1, wherein connection pool labels can be used as server-side connection pool connection tags.

6. The system of claim 1, wherein the provided connection can be partially or fully matched with a connection from the server-side connection pool.

7. The system of claim 1, wherein the client application provides, in association with the request, the plurality of client-side tags, and wherein the multiple tagging data is used by the connection pool to match the plurality of client-side tags received in association with the request, with a particular server connection for which the connection pool has associated a plurality of server-side tags.

8. The system of claim 1, wherein a request by the client application to access the database is processed by a database driver API, which database driver API is used by the client application for setting and reading the server-side tags associated with a particular server-side connection.

9. The system of claim 8, wherein the database is a sharded database, and wherein a shard key is provided in association with a request by the client application to access the database, and wherein the database driver maintains a shard topology which caches shard key ranges to locations of shards in the sharded database, for use in processing the request.

10. A method for providing access to a database in a multi-tenant environment, including support for server-side connection pool multiple tagging, comprising:
providing, at a computer including a processor, a connection pool that includes connection objects and that enables software applications to request a connection from the connection pool, and use a provided connection to access a database; and
maintaining, at the connection pool, a multiple tagging data that associates server-side tags with client-side tags, including that the multiple tagging data provides an indication of particular client-side tags for matching with particular server-side tags that are associated with server-side connections, and at a server-side connection pool:
each server-side connection, of a plurality of server-side connections, is associated with a plurality of server-side tags set on that server-side connection and provided as a string of key value pairs that are associated with that connection; and
each server-side tag, of the plurality of server-side tags, that are associated with the server-side connection is associated with a priority indicated by the string of key value pairs; and
while retrieving, at the connection pool, a tagged connection from the server-side connection pool in response to a request from a client application, for use with a client-side connection associated with a plurality of client-side tags, a particular server-side connection is selected from within the server-side connection pool based on matching:
those server-side tags that are associated with available server-side connections and provided as strings of key value pairs associated with those connections, with the plurality of client-side tags provided in the request received from the client application, as indicated by the multiple tagging data, and
the priorities associated with those server-side tags, including when more than one server-side connection is associated with server-side tags partially matching the client-side tags, then the particular server-side connection with higher priority matched tag is selected;
wherein the client application provides a callback that is used to transform a connection and associated session that is checked out from the connection pool to a state requested by the client application without a round-trip to the database, including wherein a session state fix-up callback method is called to fix up the state associated with the particular server-side connection having a partial tag match to the requested state; and
wherein the particular server-side connection is returned and attached to the client-side connection for use by the client application to access the database.

11. The method of claim 10, further comprising:
associating multiple connection properties with a particular server-side connection, and enabling the connection pool to look up a connection with multiple properties, and to provide information about a returned connection so that a requesting application can determine properties associated with the returned connection in order to determine how best to use the returned connection.

12. The method of claim 10, wherein the server-side connection pool is a Database Resident Connection Pooling (DRCP) or other environment, which supports an ability to tag a session.

13. The method of claim 10, wherein multiple properties can be associated with a particular connection in server-side connection pool; and wherein an application can look up a connection with multiple properties, while the connection pool provides information about the returned connection so that the application can look at the properties associated with the returned connection, to determine how best to use the returned connection.

14. The method of claim 10, wherein connection pool labels can be used as server-side connection pool connection tags.

15. The method of claim 10, wherein the provided connection can be partially or fully matched with a connection from the server-side connection pool.

16. A non-transitory computer readable storage medium, including instructions stored thereon which when read and executed by one or more computers cause the one or more computers to perform the method comprising:
providing, at a computer including a processor, a connection pool that includes connection objects and that enables software applications to request a connection from the connection pool, and use a provided connection to access a database; and
maintaining, at the connection pool, a multiple tagging data that associates server-side tags with client-side tags, including that the multiple tagging data provides an indication of particular client-side tags for matching with particular server-side tags that are associated with server-side connections, and at a server-side connection pool:
each server-side connection, of a plurality of server-side connections, is associated with a plurality of server-side tags set on that server-side connection and provided as a string of key value pairs that are associated with that connection; and each server-side tag, of the plurality of server-side tags, that are associated with the server-side connection is associated with a priority indicated by the string of key value pairs; and while retrieving, at the connection pool, a tagged connection from the server-side connection pool in response to a request from a client application, for use with a client-side connection associated with a plurality of client-side tags, a particular server-side connection is selected from within the server-side connection pool based on matching:

those server-side tags that are associated with available server-side connections and provided as strings of key value pairs associated with those connections, with the plurality of client-side tags provided in the request received from the client application, as indicated by the multiple tagging data, and the priorities associated with those server-side tags, including when more than one server-side connection is associated with server-side tags partially matching the client-side tags, then the particular server-side connection with higher priority matched tag is selected;

wherein the client application provides a callback that is used to transform a connection and associated session that is checked out from the connection pool to a state requested by the client application without a round-trip to the database, including wherein if a server-side connection with a partial tag match is selected, a session state fix-up callback method is called to fix up the state associated with the particular server-side connection to the requested state; and wherein the particular server-side connection is returned and attached to the client-side connection for use by the client application to access the database.

17. The non-transitory computer readable storage medium of claim 16, further comprising:

associating multiple connection properties with a particular server-side connection, and enabling the connection pool to look up a connection with multiple properties, and to provide information about a returned connection so that a requesting application can determine properties associated with the returned connection in order to determine how best to use the returned connection.

18. The non-transitory computer readable storage medium of claim 16, wherein the server-side connection pool is a Database Resident Connection Pooling (DRCP) or other environment, which supports an ability to tag a session.

19. The non-transitory computer readable storage medium of claim 16, wherein multiple properties can be associated with a particular connection in server-side connection pool; and wherein an application can look up a connection with multiple properties, while the connection pool provides information about the returned connection so that the application can look at the properties associated with the returned connection, to determine how best to use the returned connection.

* * * * *

UNITED STATES PATENT AND TRADEMARK OFFICE
CERTIFICATE OF CORRECTION

PATENT NO. : 11,290,540 B2
APPLICATION NO. : 15/644508
DATED : March 29, 2022
INVENTOR(S) : De Lavarene et al.

It is certified that error appears in the above-identified patent and that said Letters Patent is hereby corrected as shown below:

In the Specification

In Column 6, Line 58, delete "(DROP)" and insert -- (DRCP) --, therefor.

In Column 8, Line 53, delete "DROP" and insert -- DRCP --, therefor.

In Column 8, Line 61, delete "DROP" and insert -- DRCP --, therefor.

In Column 9, Line 15, delete "DROP" and insert -- DRCP --, therefor.

In Column 10, Line 27, delete "DROP" and insert -- DRCP --, therefor.

In Column 10, Line 30, delete "DROP" and insert -- DRCP --, therefor.

In Column 10, Line 32, delete "DROP" and insert -- DRCP --, therefor.

In Column 10, Line 35, delete "DROP" and insert -- DRCP --, therefor.

In Column 10, Line 35, delete "the DROP" and insert -- the DRCP --, therefor.

In Column 10, Line 38, delete "DROP" and insert -- DRCP --, therefor.

In Column 11, Line 28, delete "DROP" and insert -- DRCP --, therefor.

In Column 11, Line 29, delete "DROP" and insert -- DRCP --, therefor.

In Column 11, Line 30, delete "DROP" and insert -- DRCP --, therefor.

In Column 11, Line 34, delete "isDRCPM ultitagEnabled( )" and insert -- isDRCPMultitagEnabled( ) --, therefor.

Signed and Sealed this
Sixteenth Day of August, 2022

Katherine Kelly Vidal
*Director of the United States Patent and Trademark Office*

In Column 11, Line 41, delete "DROP" and insert -- DRCP --, therefor.

In Column 11, Line 44, delete "DROP" and insert -- DRCP --, therefor.

In Column 11, Line 55, delete "DROP" and insert -- DRCP --, therefor.

In Column 12, Line 45, delete "technology:" and insert -- technology): --, therefor.